US012800013B2

(12) United States Patent
Satony

(10) Patent No.: US 12,800,013 B2
(45) Date of Patent: Nov. 17, 2026

(54) LINEAR GUIDING SYSTEM WITH A SPINDLE DRIVE

(71) Applicant: Accuride International GmbH, Diez (DE)

(72) Inventor: Christian Satony, Rheinbrohl (DE)

(73) Assignee: Accuride International GmbH, Diez (DE)

(*) Notice: Subject to any disclaimer, the term of this patent is extended or adjusted under 35 U.S.C. 154(b) by 26 days.

(21) Appl. No.: 18/976,957

(22) Filed: Dec. 11, 2024

(65) Prior Publication Data

US 2025/0230840 A1 Jul. 17, 2025

(30) Foreign Application Priority Data

Jan. 12, 2024 (DE) .................... 10 2024 100 913.6

(51) Int. Cl.
*F16H 25/20* (2006.01)

(52) U.S. Cl.
CPC .................................... *F16H 25/20* (2013.01)

(58) Field of Classification Search
CPC ........................... F16H 25/20; F16H 2025/204
See application file for complete search history.

(56) References Cited

U.S. PATENT DOCUMENTS

| | | | |
|---|---|---|---|
| 9,814,306 B2 | 11/2017 | Koder et al. | |
| 2010/0139426 A1* | 6/2010 | Mori ....................... | F16C 33/60 74/89.32 |
| 2017/0298984 A1* | 10/2017 | Nakayama ............ | F16C 33/103 |

FOREIGN PATENT DOCUMENTS

| | | | |
|---|---|---|---|
| DE | 10-2004057714 A1 | 6/2006 | |
| DE | 10-2007057113 A1 | 5/2009 | |
| EP | 2677200 A1 | 12/2016 | |
| EP | 3919770 B1 | 9/2022 | |
| EP | 4248799 A1 | 9/2023 | |

OTHER PUBLICATIONS

European Search Report issued May 14, 2025 in appl. No. EP 24223604.0.

* cited by examiner

*Primary Examiner* — Minnah L Seoh
*Assistant Examiner* — Gregory T Prather
(74) *Attorney, Agent, or Firm* — MEDLER FERRO WOODHOUSE & MILLS PLLC

(57) ABSTRACT

A linear guide system including a first rail element and a second rail element mounted so as to be linearly displaceable relative to one another in and against a pull-out direction. A spindle drive includes a threaded spindle and a spindle nut running on the threaded spindle. The threaded spindle is mounted rotatably about a spindle axis on the first rail element or on a device fixed in or against the pull-out direction relative to the first rail element. The spindle nut is fixed in and against the pull-out direction on the second rail element, so that the spindle nut moves along the threaded spindle during a rotational motion of the threaded spindle and entrains the second rail element. The second rail element carries a spindle bearing fixed in or against the pull-out direction relative to the second rail element. that is arranged and positioned such that the spindle bearing guides the threaded spindle relative to the second rail element.

13 Claims, 7 Drawing Sheets

LINEAR GUIDING SYSTEM WITH A SPINDLE DRIVE

CROSS-REFERENCE TO RELATED APPLICATION

The application claims priority of German patent application no. 10 2024 100 913.6, filed on Jan. 12, 2024, which is incorporated by reference herein in its entirety.

TECHNICAL FIELD

The present invention relates to a linear guide system comprising a first rail element and a second rail element, wherein the first rail element and the second rail element are mounted so as to be linearly displaceable relative to one another in and against a pull-out direction, a spindle drive comprising a lead screw and a nut running on the lead screw, wherein the lead screw is mounted rotatably about a spindle axis on the first rail element or is mounted rotatably about the spindle axis on a device fixed in or against the pull-out direction relative to the first rail element, wherein the nut is fixed in and against the pull-out direction on the second rail element, so that the nut moves along the lead screw during a rotary motion of the lead screw about the spindle axis and entrains the second rail element.

BACKGROUND

Linear guide systems, in particular telescopic rails, with at least two rail elements and possibly a rolling element cage with rolling elements accommodated therein to reduce friction between the rail elements are known from the prior art in a variety of embodiments. They are used in various household appliances, but also in automotive engineering and in many other applications. Motorised linear guide systems are already used in a large number of applications. A spindle drive is often used as a linear drive. Such a spindle drive converts a rotary motion of a lead screw into a linear motion of a nut guided on the lead screw and thus into a linear motion of the rail elements relative to each other.

It has turned out to be problematic that the lead screws of the spindle drives tend to wobble around their axis of rotation or oscillate relative to the rail elements. If the lead screw collides with one of the rail elements, noise is generated. Wobbling and swinging also impair the feel and running of the guide system. The lead screws must have a high degree of straightness in order to avoid wobbling. In addition, the effects on running, noise and haptics described above are speed-dependent. The latter limits the travelling speed of the first and second rail elements relative to each other to low velocities.

In contrast, the object of the present invention is to provide a motor-driven linear guide system which reduces or avoids at least one of the aforementioned disadvantages.

SUMMARY

The aforementioned object is solved by a linear guide system according to the appended independent claim 1. For this purpose, in the linear guide system of the type mentioned at the beginning, the second rail element carries a spindle bearing fixed in or against the pull-out direction relative to the second rail element. The spindle bearing is arranged and positioned in such a way that the spindle bearing guides the lead screw relative to the first rail element with respect to the second rail element at least in a first pull-out position of the second rail element.

The present invention is based on the idea of providing a linear guide system with a spindle drive, in which the lead screw is guided in a spindle bearing in addition to a drive-side bearing. This spindle bearing is supported by the second rail element and is fixed in or against the pull-out direction relative to the second rail element. The spindle bearing therefore follows the relative movement of the second rail element with respect to the first rail element together with the second rail element.

Bearing the lead screw in the spindle bearing results in smoother running of the linear guide system. Longer lead screw can be realised, the noise generated when the first and second rail elements are moved relative to each other is reduced and higher rotational speeds and thus higher travel speeds of the first and second rail elements relative to each other can be achieved.

Bearing the lead screw in a spindle bearing that moves together with the second rail element is also advantageous, as this bearing does not have to take into account the motion of the nut relative to the lead screw. A collision between the nut and spindle bearing is ruled out. Bearing the lead screw on the second rail element also allows a rolling element cage to move between the first and second rail elements.

Surprisingly, it has been shown that additional support of the lead screw during the movement of the first and second rail elements relative to each other is not absolutely necessary in all operating situations. Embodiments are therefore conceivable in which the spindle bearing supports the lead screw only at the first pull-out position or around it, while in another, second pull-out position of the second rail element relative to the first rail element, the spindle bearing can be out of engagement with the lead screw so that the latter then rotates freely. A pull-out position in the sense of the present application is a relative position of the second rail element with respect to the first rail element measured along the pull-out direction.

In an embodiment of the invention, the spindle bearing comprises a bearing bush accommodating the lead screw, wherein, at least in a first pull-out position, the lead screw is in sliding engagement with the bearing bush when the lead screw moves relative to the second rail element in or against the pull-out direction, so that the spindle bearing supports the lead screw. The bearing bush refers to the surface section of the spindle bearing that is in sliding engagement with the lead screw or can be brought into sliding engagement.

The bearing bush of the spindle bearing serves to support or mount the lead screw in a radial direction, while the bearing bush is in sliding engagement with the lead screw in and against the pull-out direction. The spindle bearing is not a second threaded nut; there is no positive locking between the lead screw and bearing bush in or against the pull-out direction.

The pull-out direction is the direction in which the second rail element is moved relatively linearly with respect to the first rail element from a fully retracted pull-out position in order to reach a fully extended pull-out position. Accordingly, a direction opposite to the pull-out direction is the direction in which the second rail element is moved relative to the first rail element in order to return to a fully retracted pull-out position.

In this application, an axial direction and a radial direction refer to the axis of rotation of the lead screw. In an embodiment, the axis of rotation of the lead screw is substantially parallel to the pull-out direction.

In an embodiment of the invention, the bearing bush comprises an axial length parallel to the pull-out direction, wherein the axial length of the bearing bush is smaller than a travel distance of the bearing bush relative to the lead screw between a maximum retracted pull-out position of the second rail element relative to the first rail element and a maximum extended pull-out position of the second rail element relative to the first rail element. A short axial length of the bearing bush compared to the maximum travel of the second rail element relative to the first rail element results in smooth running of the lead screw with acceptable forces due to the sliding friction of the bearing bush relative to the lead screw and reduced jamming between the lead screw and the bearing bush.

In an embodiment of the invention, the bearing bush comprises an axial length of 40 mm or less, preferably of 30 mm or less and particularly preferably of 25 mm or less.

On the other hand, an embodiment of the bearing bush in which the bearing bush is as long as possible in the pull-out direction retains a lubricant for lubricating the lead screw better than the threaded nut.

In an embodiment of the invention, the spindle bearing comprises one or more lubrication pockets in the area of the bearing bush for receiving a lubricant.

In an embodiment of the invention, the bearing bush is positioned on the second rail element in such a way that in the maximum extended position of the second rail element relative to the first rail element, the bearing bush is out of engagement with the lead screw. It has been shown that such an embodiment supports the lead screw in an optimised manner during the movement of the first and second rail elements relative to each other. The bearing bush is ideally positioned over a large part of the travel path, while the disengagement of the bearing bush and the lead screw in the maximally extended pull-out position has no negative effects.

In a further embodiment of the invention, the bearing bush comprises a distance of 100 mm or less, preferably of 90 mm or less and particularly preferably of 80 mm or less from the nut in a direction parallel to the pull-out direction. The distance between the bearing bush and the nut is an essential parameter for achieving smoother running of the lead screw. A larger distance leads to greater vibration of the arrangement.

In an embodiment of the invention, the bearing bush of the spindle bearing is positioned on the second rail element in such a way that, in each extension position of the second rail element relative to the first rail element, a free end of the lead screw is at a distance of at most 100 mm, preferably at most 90 mm and particularly preferably at most 80 mm from the bearing bush in which the lead screw is accommodated. This maximum projection of the free end of the lead screw in relation to the bearing bush is referred to as the maximum free (unsupported) lead screw length.

The free end of the lead screw is that end of the lead screw which is opposite the end of the lead screw coupled to the motor or to a coupling.

In an embodiment of the invention, the bearing bush is positioned on the second rail element in such a way that in the maximum extended pull-out position of the second rail element relative to the first rail element, the bearing bush is positioned approximately where the first rail element ends in the pull-out direction.

In an embodiment of the invention, the linear guide system comprises a second spindle bearing with a second bearing bush spaced from the spindle bearing, which is then referred to as the first spindle bearing, in the pull-out direction.

This has proven to be particularly useful if at least the length of the first and/or second rail element is 450 mm or more or the free unsupported spindle length in the fully retracted extension position would be 80 mm or more, 90 mm or more or 100 mm or more.

In an embodiment, the second bearing bush of the second spindle bearing comprises a distance from the first bearing bush of the first spindle bearing of at most 100 mm, preferably of at most 90 mm and particularly preferably of at most 80 mm.

In an embodiment of the invention, the second bearing bush of such a second spindle bearing is positioned at approximately half the length of the second rail element.

Embodiments with more than two spindle bearings are also feasible.

Instead of a second spindle bearing, it is also possible to design the single spindle bearing so that it comprises a long bearing bush. In an embodiment of the invention, the bearing bush of the spindle bearing is shorter by a value in a range of 100 mm to 130 mm than the overall length of the first rail element in the pull-out direction. The shortening of the bearing bush compared to the overall length of the first rail element takes into account the motor adapter protruding into the first rail element as well as the length of the nut and, if necessary, the deflection unit for the belt drive for synchronising a third rail element.

In an embodiment, a long bearing bush is realised by the spindle bearing being integrally formed with the second rail element. In an embodiment of the invention, the second rail element is designed as an extrusion profile made of plastic or metal, preferably aluminium, so that all elements of the rail element and the spindle bearing are formed by the extrusion profile. In an embodiment of the invention, the spindle bearing comprises a lead-in area, wherein the lead-in area adjoins the bearing bush against the pull-out direction and widens from a diameter of the bearing bush against the pull-out direction, wherein during operation of the system the free end of the lead screw can be moved through the lead-in area into the bearing bush. In an embodiment of the invention, an inner surface of the inlet region is arranged in the shape of a truncated cone, wherein the smaller diameter of the truncated cone is equal to the diameter of the bearing bush.

In an embodiment of the invention, the spindle bearing is arranged symmetrically so that the side of the bearing bush facing away from the lead-in area has an identical shape to the bearing bush in the pull-out direction. In this way, the mounting of the spindle bearing is neutral with respect to misorientation.

In an embodiment of the invention, the spindle bearing and the second rail element are arranged in two parts. In an embodiment of the invention, the spindle bearing comprises a part made of plastic, preferably an injection-moulded part, which is mounted on the second rail element. In an embodiment of the invention, the part of the spindle bearing made of plastic comprises polyoxymethylene (POM).

In an embodiment, the spindle bearing comprises a housing made of plastic, for example POM. In one such embodiment, the bearing bush comprises in particular a material with a lower sliding friction compared to the housing with respect to the lead screw. In an embodiment, the bearing bush is made of a metal, in particular a brass-lead sintered material. In an embodiment, the bearing bush arranged in this way is pressed into the housing or the bearing bush is injection-moulded with the plastic of the housing.

In an embodiment of the invention, at least the first or the second rail element comprises a rail back and two legs carrying running surfaces for rolling elements and extending at an angle to the rail back. A direction parallel to the rail backs of the first and second rail elements is also referred to as the upward direction.

In an embodiment, the spindle bearing is formed by a bearing block with the bearing bush accommodating the lead screw and a mounting section. The mounting section is used to connect the spindle bearing to the second rail element. In an embodiment, the mounting section is clamped at least force-fit between the two legs of the second rail element. Such a design of the spindle bearing as a bearing block with the bearing bush and a mounting section, which can be clamped into the profile of the second rail element, is adapted to the shape of such a second rail element.

In an embodiment of the invention, the mounting section is clipped into an aperture in the rail back of the second rail element at least in a form-fit or force-fit manner.

In an embodiment of the invention, the mounting section comprises a projection or a recess, wherein the rail back of the second rail element comprises a complementary recess or a complementary projection. The projection engages in the recess so that the bearing block is positively fixed to the second rail element in and against the pull-out direction. While clamping the mounting section between the legs provides a positive fit for movement of the bearing block in the upward direction perpendicular to the pull-out direction, clamping in the pull-out direction only provides a force-fit. The combination of a projection and a complementary recess, on the other hand, also provides a positive fit between the bearing block and the second rail element in the pull-out direction.

In an embodiment of the invention, the legs of the second rail element and the mounting section of the bearing block are arranged in such a way that the legs press the bearing block against the back of the rail of the second rail element. In this way, the bearing block is also positively secured to the second rail element in a direction perpendicular to the pull-out direction and perpendicular to the upward direction.

The installation space between the rail backs of the first rail element and the second rail element is limited in most embodiments. In an embodiment in which rolling elements are guided between the running surfaces of the first and second rail element in a rolling element cage, the rolling element cage must also be able to pass unhindered between the spindle bearing and the back of the rail of the first rail element.

One way of taking the installation space into account is the open design of the bearing bush. Therefore, in an embodiment of the invention, the bearing bush is open in sections. In such an open design, the bearing bush is not completely cylindrical, but the cylindrical inner wall surface of the bearing bush encloses an angle of less than 360 degrees. In an embodiment of the invention, the bearing bush is open in a region towards the back of the rail of the first rail element.

In an embodiment of the invention, the bearing bush, which is open in sections, surrounds the lead screw by more than 180 degrees and less than 360 degrees in order to nevertheless achieve an appropriate bearing in the radial direction of the lead screw.

It will be understood that, according to the invention, the nut is fixed to the second rail element in a rotationally fixed manner with respect thereto, i.e. the nut does not rotate with the lead screw.

In an embodiment of the invention, the nut is floatingly mounted on the second rail element in at least one direction perpendicular to the pull-out direction. The nut floating in this way serves to compensate for manufacturing tolerances. It also prevents the nut from jamming on the lead screw if the lead screw swings or wobbles due to an imbalance. However, such a floating nut does not comprise any bearing function for the lead screw in a radial direction of the lead screw. In an embodiment of the invention, the nut is floatingly mounted in the upward direction as well as in a direction perpendicular to the upward direction and to the pull-out direction (this is also perpendicular to the rail backs of the first and second rail elements). It is understood that also in such an embodiment, the nut is fixed to the second rail element in and against the pull-out direction in order to fulfil its drive function for the extension and retraction movement of the two rail elements relative to each other.

In a further embodiment of the present invention, the linear guide system comprises an electric motor. Such an electric motor is fixed relative to the first rail element in and against the pull-out direction. The lead screw is effectively coupled to the electric motor in such a way that the electric motor causes the lead screw to rotate during operation of the linear guide system.

An electric motor in the sense of the present invention is a motor with a rotating motor shaft for providing a torque. In an embodiment of the invention, the electric motor is selected from a group consisting of a stepper motor, a brushless direct current motor (BLDC) or a brushed direct current motor (DC).

In an embodiment of the invention, the lead screw on the first rail element is mounted exclusively on the electric motor.

In an embodiment of the invention, the spindle bearing is mounted as the last component when assembling the linear guide system. In an embodiment of the invention, such assembly is carried out through a recess in the back of the rail of the second rail element and the spindle bearing is preferably clipped into the hole.

In an embodiment of the invention, the linear guide system is selected from a group consisting of an extension guide, a telescopic rail and a linear guide. The generic term ‘linear guide system’ includes sliding guides and rolling element guides. The term ‘linear guide system’ is to be understood broadly as comprising not only designs in which the first rail element and the second rail element comprise approximately the same length, i.e. in particular telescopic rails, but also linear guides in which one of the rail elements, in particular the second rail element, is significantly shorter than the other rail element.

In an embodiment of the invention, the first rail element is the stationary rail element.

According to the present invention, the linear guide system comprises a first rail element and a second rail element. However, this does not exclude that the linear guide system, in particular if it is an extension or telescopic rail, comprises further rail elements, in particular an additional third rail element, for example for providing a full extension.

In an embodiment of the invention, the linear guide system comprises a first rail element, a second rail element and a third rail element. In one such embodiment, the second rail element has four running surfaces. Rolling elements roll between the two running surfaces of the first rail element and two of the four running surfaces of the second rail element, and rolling elements also roll between the other two of the four running surfaces of the second rail element and the two running surfaces of the third rail element.

In an embodiment of the invention, the first and second rail elements each comprise two running surfaces, wherein rolling elements accommodated in a rolling element cage are positioned on the two running surfaces of the first rail element and on the two running surfaces of the second rail element. These rolling elements roll on the respective running surfaces and reduce friction between the first rail element and the second rail element. For the purposes of the present application, a rolling element is understood to be a body of rotation which, as an element of a guide, significantly reduces the friction between the various rail elements and thus facilitates relative movement of two rail elements with respect to one another. Rolling elements are, for example, bearing balls, rollers, barrels, needles or cones. In an embodiment of the present invention, the rolling elements are bearing balls. It is understood that in this case the rolling element cage is a ball cage.

In an embodiment of the invention, at least the first rail element or the second rail element is made of a material selected from a group consisting of sheet steel, aluminised sheet steel and stainless steel.

BRIEF DESCRIPTION OF THE FIGURES

Further advantages, features and possible applications of the present invention become apparent from the following description of an embodiment and the associated figures. In the figures, identical elements are denoted by identical reference numbers.

DETAILED DESCRIPTION OF PARTICULAR EMBODIMENTS

Figure 1:
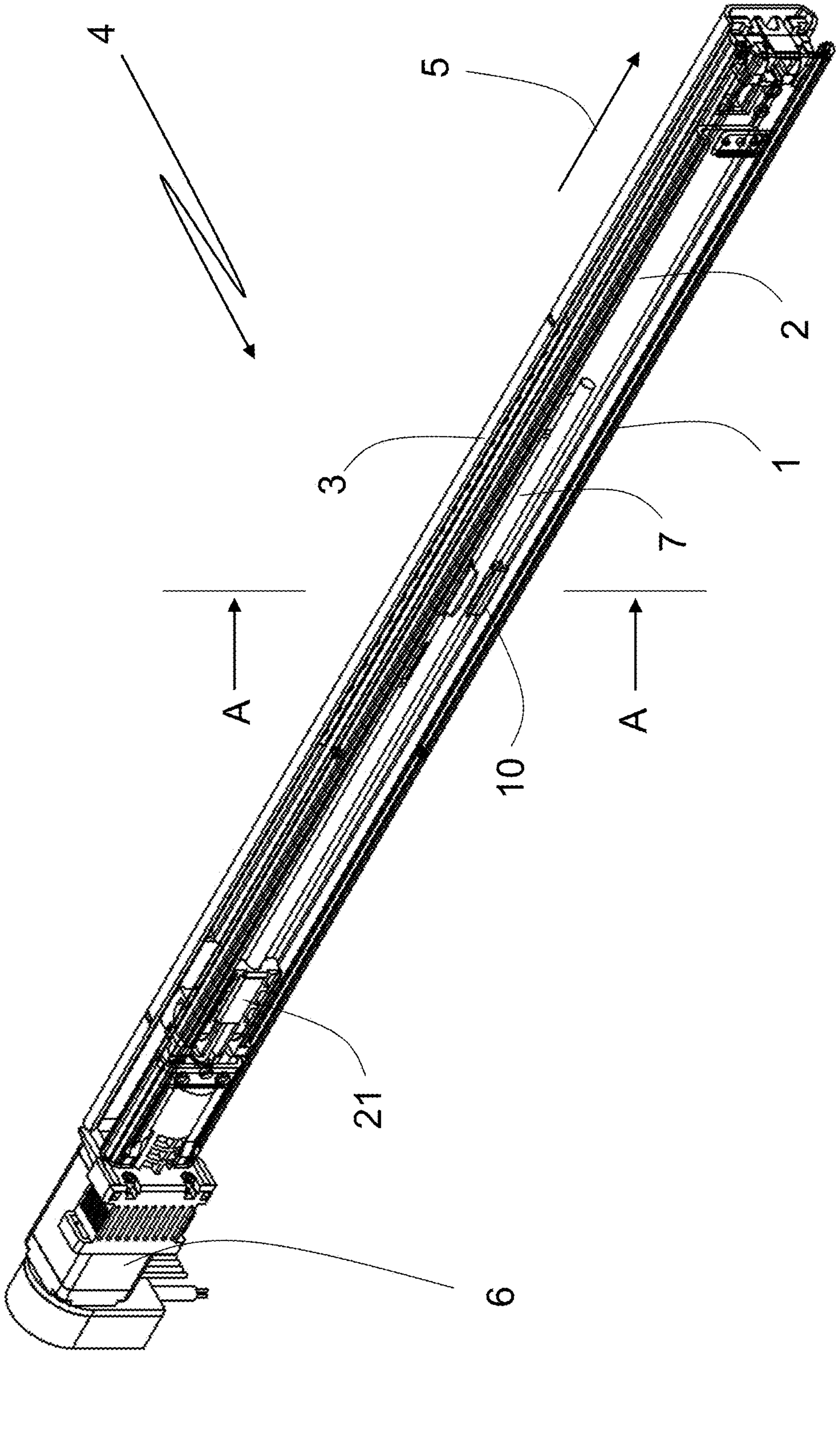
FIG. 1 is an isometric, partially transparent view of a telescopic rail according to the invention from diagonally above in the fully retracted state.
Figure 2:
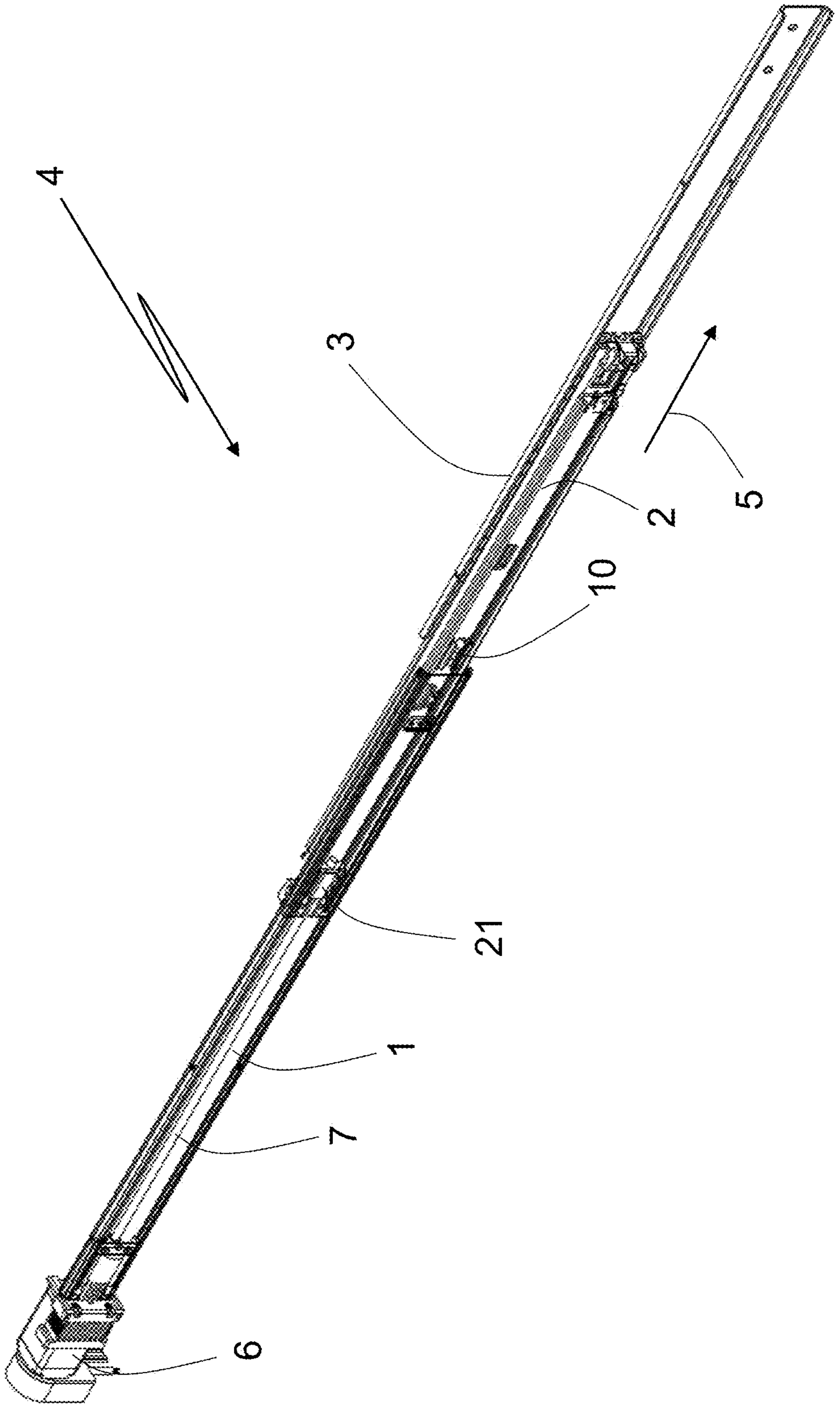
FIG. 2 is an isometric, partially transparent view of the telescopic rail of FIG. 1 in the fully extended state.
Figure 3:
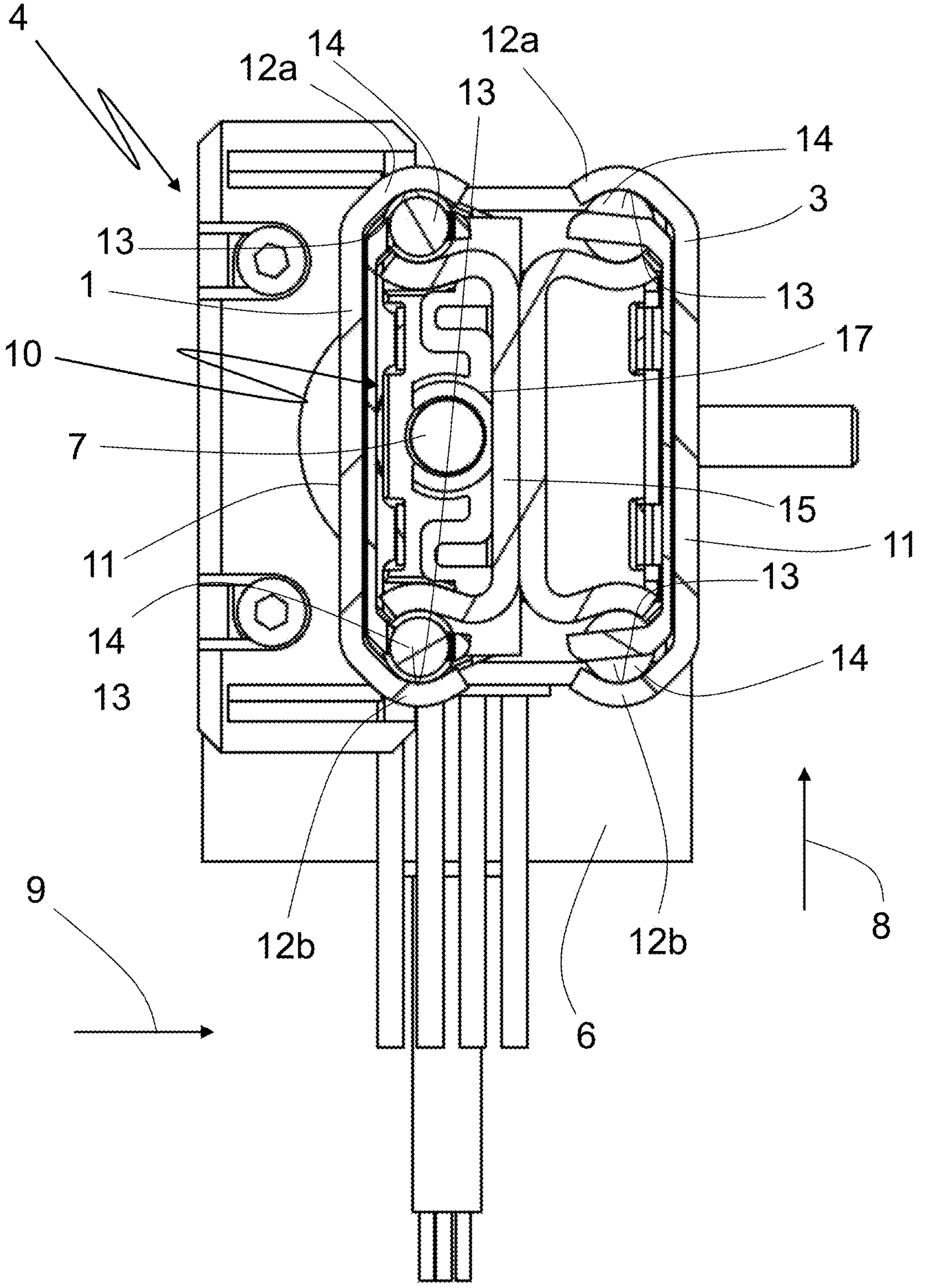
FIG. 3 is a sectional view through the telescopic rail from FIGS. 1 and 2 along line A-A of FIG. 1.
Figure 4:
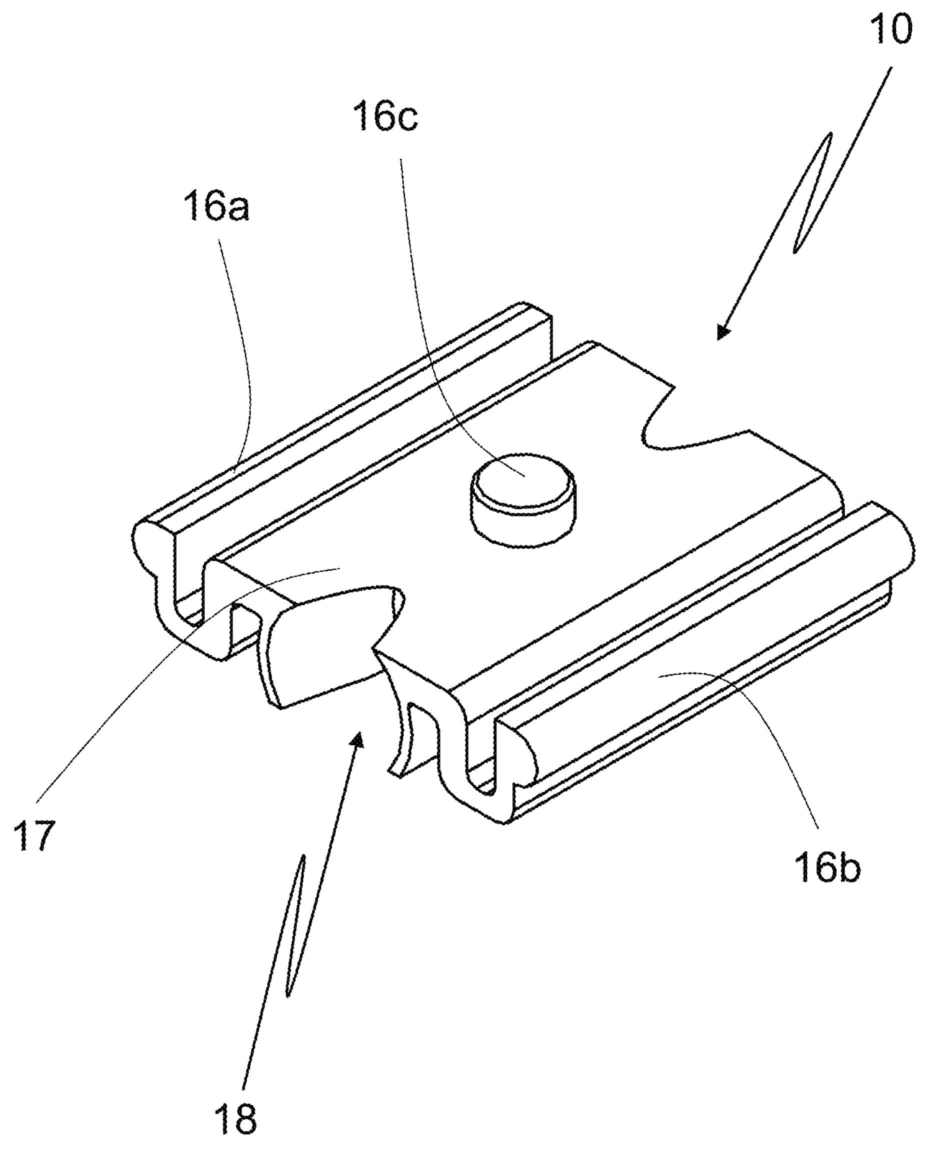
FIG. 4 is an isometric view of an embodiment of a spindle bearing for the telescopic rail of FIGS. 1 to 3.
Figure 5:
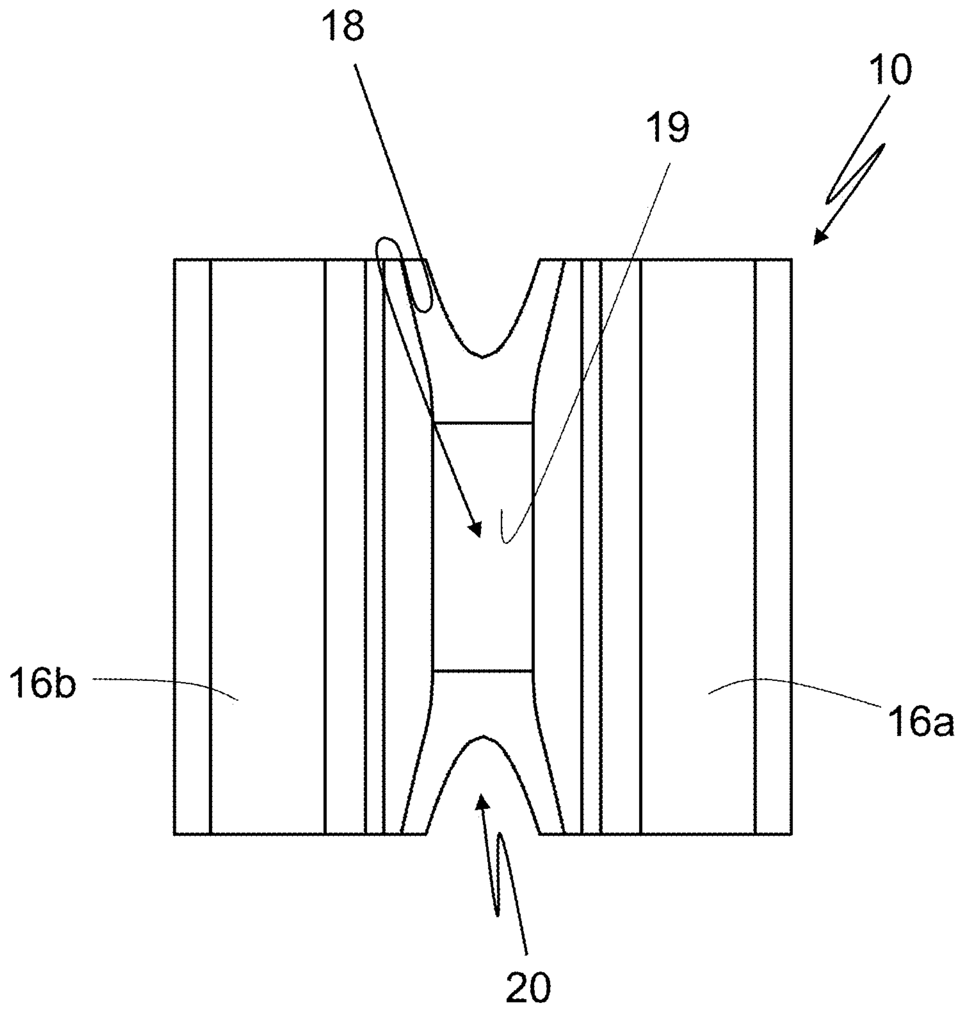
FIG. 5 is a top view from below of the spindle bearing of FIG. 4.
Figure 6:
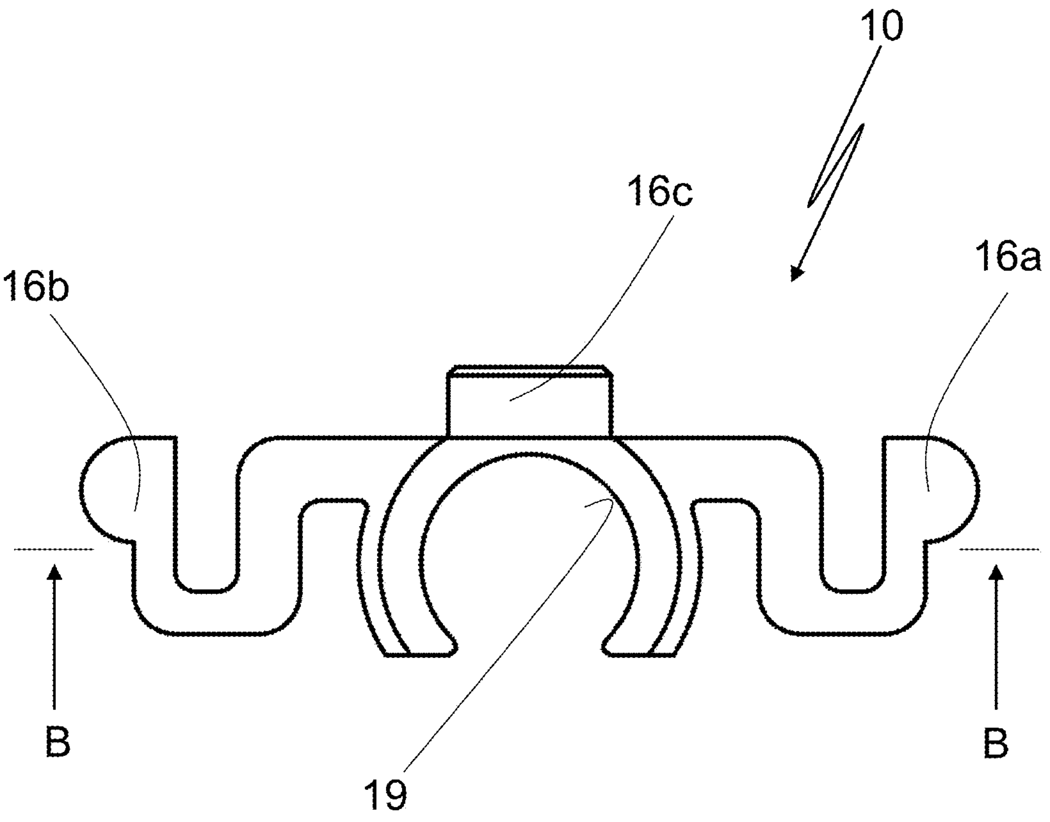
FIG. 6 is a front view of the spindle bearing of FIGS. 3 and 4.
Figure 7:
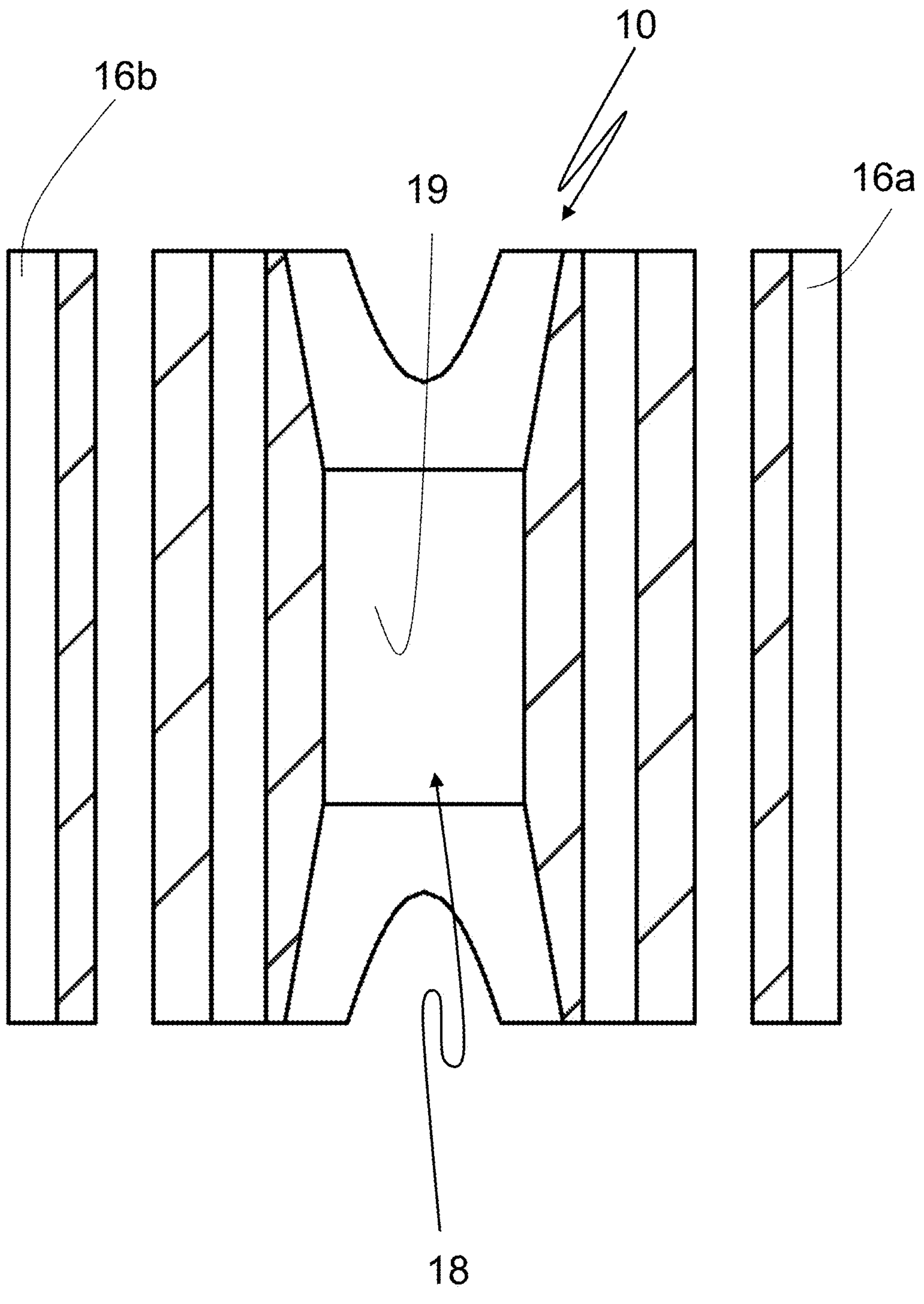
FIG. 7 is a sectional view through the spindle bearing of FIGS. 3 to 6 along line B-B of FIG. 6.

FIGS. 1 to 7 illustrate a variant of a linear guide system according to the invention in the form of a telescopic pull-out 4. The telescopic pull-out 4 is a full extension with a first rail element 1, a second rail element 2 and a third rail element 3. FIG. 1 shows the telescopic pull-out 4 in its fully retracted state, while FIG. 2 shows a representation of the fully extended state, in which the third rail element 3 no longer overlaps with the first rail element 1 in the pull-out direction 5.

The second rail element 2 forms a centre rail, which is mounted both on the first stationary rail element 1 and movable relative to it in and against the pull-out direction and is also mounted on the third rail element 3 so as to be movable in and against the pull-out direction.

The first rail element 1 and the third rail element 3 each comprise a C-shaped profile. A rail back 11 connects two respective legs 12*a*, 12*b*. The legs 12*a*, 12*b* form running surfaces 13 that point towards each other. Rolling elements in the form of bearing balls 14 roll on the running surfaces 13. These bearing balls 14 simultaneously roll on the running surfaces 13 of the second rail element 2. The second rail element 2 consists of two C-shaped profiles that are connected to each other at their backs 15.

The telescopic pull-out 4 is motorised by means of an electric motor 6, so that the second rail element 2 moves automatically relative to the first rail element 1 and the third rail element 3 moves automatically relative to the second rail element 2. The electric motor 6 drives a rotary motion of a lead screw 7 coupled to the electric motor 6 or its motor shaft. The lead screw 7 is clearly recognisable in the cross-sectional view of FIG. 3.

A nut is fixed to the second rail element 2 so that it cannot rotate. In addition, the nut is fixed to the second rail element 2 in and against the pull-out direction 5. Therefore, a rotary motion of the lead screw 7 leads to a linear motion of the nut and thus of the second rail element 2 relative to the first rail element 1. The simultaneous, synchronous extension motion of the third rail element 3 relative to the second rail element 2 is achieved by synchronisation via a belt drive, as described in detail in European patent EP 3 919 770 B1.

The lead screw 7 is only mounted on the stationary first rail element 1 via the electric motor 6.

While the nut 21 is fixed against rotation relative to the second rail element and in and against the pull-out direction on the second rail element 2, the nut 21 is floatingly mounted on the second rail element 2 in two directions perpendicular to each other and perpendicular to the pull-out direction 5, namely in the upward direction 8 and in the direction perpendicular thereto 9.

Without the spindle bearing 10 according to the invention, this clearance of the threaded nut with respect to the second rail element 2 in the directions 8 and 9 leads to the lead screw 7 being able to wobble and/or vibrate almost unhindered with respect to the second rail element 2. However, such a wobbling or vibrating movement of the lead screw 7 may lead to noise when the lead screw 7 strikes against the second rail element 2 or the first rail element 1 and to vibrations, which may also be transmitted to the elements connected to the telescopic pull-out 4. Therefore, according to the invention, the spindle bearing 10 is provided on the second rail element 2.

The structure and function of the spindle bearing 10 is now described with reference to the enlarged illustrations of the spindle bearing 10 in FIGS. 4 to 7. The spindle bearing 10 is attached to the second rail element 2 at the position of the second rail element 2 labelled with line A-A in FIG. 1. In this way, when the second rail element 2 is extended relative to the first rail element 1, the spindle bearing 10 moves along the lead screw until the lead screw slips out of the spindle bearing. In this way, the lead screw 7 is optimally supported over a large part of its travel. Surprisingly, the fact that the lead screw 7 slips out of the spindle bearing shortly before reaching the maximum extended pull-out position (see FIG. 2) does not impair the running behaviour of the telescopic pull-out 4.

The spindle bearing 10 is a bearing block 17 made of POM by injection moulding, which is arranged in one piece and is mounted on the second rail element 2 during system integration. The bearing block 17 consists of a two-part mounting section 16*a*, 16*b* and a bearing bush 18. The mounting section 16*a*, 16*b* clamps the bearing block 17 between the legs 12a, 12b carrying the running surfaces 13 of the second rail element 2. Due to the C-shaped profile of the second rail element 2, the mounting section 16a, 16b of the bearing block 17 is clamped to the second rail element 2 in such a way that the bearing block 17 is pressed towards the back of the rail 15 of the second rail element 2. The two parts of the mounting section 16a, 16b lead to a form-fit connection between the bearing block 17 and the second rail element 2 in the upward direction 8. In contrast, the mounting section 16a, 16b in the pull-out direction 5 only causes a force-fit due to the static friction between the surface of the mounting section 16a, 16b and the legs 12a, 12b of the second rail element 2. In order to additionally provide a positive fit between the bearing block 17 and the second rail element 2 in and against the pull-out direction 5, the mounting section also comprises a projection 16c, which engages positively in the rail back 15 of the second rail element 2 and reliably absorbs all forces that are introduced into the bearing block 17 in and against the pull-out direction 5.

So that the bearing block 17 mounted on the second rail element 2 can fulfil its bearing function, it comprises a bearing bush 18. The bearing bush 18 is a cylindrical inner wall section 19 of the bearing block 17. The radius of the inner wall section 19 is dimensioned in such a way that the lead screw 7 performs a sliding movement relative to the inner wall section 19 and yet the lead screw 7 is supported in the radial direction. The bearing block 17 further comprises a lead-in area 20, wherein in the lead-in area 20 the inner wall section widens outwards in a frustoconical shape starting from the nominal radius of the inner wall section 19 of the bearing bush 18, i.e. against the pull-out direction 5. In this way, the front, free end of the lead screw 7 can run back into the bearing bush 18 after leaving it when the second rail element 2 is retracted against the pull-out direction 5.

In the embodiment shown, the bearing block 17 is symmetrical, i.e. it also widens on the side of the bearing bush 18 facing away from the lead-in area 20. The symmetry merely serves to avoid having to pay attention to the orientation of the bearing block 17 during assembly.

The cylindrical inner wall section 19 is open towards the back of the first rail element 1. In other words, the surface 19 does not form a complete cylinder. However, the inner wall section 19 surrounds the lead screw 7 by approximately 270°. This can be clearly seen in the sectional view in FIG. 6. Opening the bearing bush 18 towards the rail back 11 of the first rail element 1 reduces the size of the bearing for the lead screw 7. This is necessary because the ball cage, which guides the bearing balls 14, must also run in the space between the rail back of the second rail element 2 and the rail back of the first rail element 1.

For the purposes of the original disclosure, it is pointed out that all features, as they are apparent to a person skilled in the art from the present description, the drawings and the claims, even if they have been described specifically only in connection with certain further features, can be combined both individually and in any combination with other features or groups of features disclosed herein, unless this has been expressly excluded or technical circumstances make such combinations impossible or meaningless. A comprehensive, explicit description of all conceivable combinations of features is omitted here only for the sake of brevity and readability of the description.

Whilst the invention has been illustrated and described in detail in the drawings and the preceding description, this illustration and description is given by way of example only and is not intended to limit the scope of protection as defined by the claims. The invention is not limited to the disclosed embodiments.

Variations of the disclosed embodiments will be obvious to those skilled in the art from the drawings, the description and the appended claims. In the claims, the word 'comprising' does not exclude other elements or steps, and the indefinite article 'one' or 'a' does not exclude a plurality. The mere fact that certain features are claimed in different claims does not exclude their combination. Reference numbers in the claims are not intended to limit the scope of protection.

LIST OF REFERENCE NUMBERS

1 first rail element
2 second rail element
3 third rail element
4 telescopic pull-out
pull-out direction
6 electric motor
7 lead screw
8 upward direction
9 direction perpendicular to the upward direction and to the pull-out direction
spindle bearing
11 rail back
12a, 12b leg
13 running surfaces
14 bearing ball
rail back
16a, 16b mounting section
16c projection
17 bearing block
18 bearing bush
19 inner wall section
20 lead-in area
21 nut

The invention claimed is:

1. A linear guide system comprising a first rail element and a second rail element, wherein the first rail element and the second rail element are mounted so as to be linearly displaceable relative to one another in and against a pull-out direction, and a spindle drive comprising:

a lead screw, a nut running on the lead screw, and a spindle bearing wherein the lead screw is mounted rotatably about a spindle axis on the first rail element or is mounted rotatably about the spindle axis on a device fixed in and against the pull-out direction relative to the first rail element, wherein the nut is mounted to the second rail element and fixed in and against the pull-out direction relative to the second rail element, so that the nut moves along the lead screw during a rotary motion of the lead screw about the spindle axis and entrains the second rail element, wherein the spindle bearing is mounted to the second rail element fixed in and against the pull-out direction relative to the second rail element, and wherein the spindle bearing is arranged and positioned such that the spindle bearing guides the lead screw at least in a first pull-out position of the second rail element relative to the first rail element with respect to the second rail element.

2. The linear guide system according to claim 1, wherein the spindle bearing comprises a bearing bush receiving the lead screw, wherein at least in the first pull-out position the lead screw is in a sliding engagement with the bearing bush during a relative motion of the lead screw with respect to the second rail element in or against the pull-out direction, so that the spindle bearing supports the lead screw.

3. The linear guide system according to claim 2, wherein the bearing bush comprises an axial length parallel to the pull-out direction, wherein the axial length of the bearing bush is smaller than a travel distance of the bearing bush relative to the lead screw between a maximum retracted pull-out position of the second rail element relative to the first rail element and a maximum extended pull-out position of the second rail element relative to the first rail element.

4. The linear guide system according to claim 3, wherein the bearing bush is positioned on the second rail element in such a way that in the maximum extended pull-out position of the second rail element relative to the first rail element, the bearing bush is out of engagement with the lead screw.

5. The linear guide system according to claim 4, wherein the bearing bush comprises a distance (d) of 50 mm or less from the nut in a direction parallel to the pull-out direction.

6. The linear guide system according to claim 2, wherein the spindle bearing comprises a lead-in area, wherein the lead-in area adjoins the bearing bush against the pull-out direction and widens starting from a diameter of the bearing bush against the pull-out direction, wherein, during operation of the guide system, a free end of the lead screw can be moved through the lead-in area into the bearing bush.

7. The linear guide system according to claim 2, wherein the second rail element comprises a rail back and two running surfaces for rolling elements carrying legs extending at an angle relative to the rail back, wherein the spindle bearing is formed by a bearing block with the bearing bush receiving the lead screw and a mounting section, and wherein the mounting section is clamped between the two legs at least in a force-fit manner.

8. The linear guide system according to claim 7, wherein the mounting section comprises a projection or recess, wherein the rail back of the second rail element comprises a recess complementary thereto or a projection complementary thereto, so that the bearing block is positively fixed to the second rail element in and against the pull-out direction.

9. The linear guide system according to claim 7, wherein the legs of the second rail element and the mounting section of the bearing block are arranged in such a way that the legs press the bearing block against the rail back.

10. The linear guide system according to claim 2, wherein the bearing bush is open in sections towards the first rail element.

11. The linear guide system according to claim 1, wherein the nut is floatingly received on the second rail element in at least one direction perpendicular to the pull-out direction.

12. The linear guide system according to claim 1, wherein the linear guide system comprises an electric motor, and wherein the lead screw is operatively coupled to the electric motor such that the electric motor sets the lead screw into a rotational motion during operation of the linear guide system.

13. The linear guide system according to claim 12, wherein the lead screw is mounted on the first rail element exclusively via the electric motor.

* * * * *